(12) United States Patent
Meier et al.

(10) Patent No.: US 10,934,103 B2
(45) Date of Patent: Mar. 2, 2021

(54) CONVEYING STORAGE DEVICE AND METHOD FOR OPERATING THE CONVEYING STORAGE DEVICE

(71) Applicant: Krones AG, Neutrabling (DE)

(72) Inventors: Matthias Meier, Saal (DE); Torsten Kilgenstein, Neumarkt (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 16/630,846

(22) PCT Filed: May 29, 2018

(86) PCT No.: PCT/EP2018/064019
§ 371 (c)(1),
(2) Date: Jan. 13, 2020

(87) PCT Pub. No.: WO2019/011515
PCT Pub. Date: Jan. 17, 2019

(65) Prior Publication Data
US 2020/0140208 A1 May 7, 2020

(30) Foreign Application Priority Data
Jul. 14, 2017 (DE) .................. 10 2017 212 124.6

(51) Int. Cl.
*B65G 47/68* (2006.01)
*B65G 47/51* (2006.01)
(Continued)

(52) U.S. Cl.
CPC .......... *B65G 47/682* (2013.01); *B65G 35/04* (2013.01); *B65G 47/5131* (2013.01);
(Continued)

(58) Field of Classification Search
CPC ........ B65G 15/12; B65G 35/04; B65G 47/30; B65G 47/52; B65G 47/682; B65G 47/766;
(Continued)

(56) References Cited

U.S. PATENT DOCUMENTS 8,205,737 B2 * 6/2012 Dirmeier ............ B65G 47/5131
198/347.1
2005/0178640 A1 8/2005 Petrovic
(Continued)

FOREIGN PATENT DOCUMENTS

DE 2120239 A1 * 11/1972 ........... B65G 47/682
DE 2120239 A1 11/1972
(Continued)

OTHER PUBLICATIONS

International Search Report and Written Opinion of International Patent Application No. PCT/EP2018/064019 dated Sep. 11, 2018, with English translation, 23 pages.

*Primary Examiner* — Gene O Crawford
*Assistant Examiner* — Lester III Rushin
(74) *Attorney, Agent, or Firm* — Lowenstein Sandler LLP (57) ABSTRACT

Embodiments relate to a conveying storage device for containers, comprising: a first/second drivable conveyor which can convey containers on a first/second conveying surface in a first/second direction, the first and the second conveyor being positioned parallel to one another such that containers are transferable from the first to the second conveying surface; a transfer device, which is movable along the conveyor, for transferring containers from the first to the second conveying surface; a guide body which is movable along a region between the first and the second conveyor above the first and the second conveying surface; and a guide railing for guiding and separating containers, said guide rail extending at an angle to the second direction (Continued)

and above the second conveying surface. The guide railing is variable in length and cooperates with the guide body such that the length of the guide railing and the angle can be varied.

20 Claims, 6 Drawing Sheets

(51) Int. Cl.
    *B65G 47/76*     (2006.01)
    *B65G 35/04*     (2006.01)

(52) U.S. Cl.
    CPC .... *B65G 47/766* (2013.01); *B65G 2201/0235* (2013.01); *B65G 2203/0208* (2013.01); *B65G 2203/044* (2013.01); *B65G 2811/06* (2013.01)

(58) Field of Classification Search
    CPC ........ B65G 2201/0235; B65G 2201/44; B65G 2203/0208; B65G 2811/06
    USPC .......................................... 198/456
    See application file for complete search history.

(56) References Cited

U.S. PATENT DOCUMENTS

| | | | |
|---|---|---|---|
| 2008/0257685 A1* | 10/2008 | Huttner | B65G 47/5131 |
| | | | 198/456 |
| 2010/0193330 A1 | 8/2010 | Petrovic et al. | |
| 2017/0152112 A1 | 6/2017 | Azzali | |

FOREIGN PATENT DOCUMENTS

| | | |
|---|---|---|
| DE | 10015566 A1 | 10/2001 |
| DE | 60308498 T2 | 6/2007 |
| EP | 0191584 A2 | 8/1986 |
| EP | 3023368 A1 | 5/2016 |
| FR | 2918974 A1 | 1/2009 |
| GB | 2302855 A | 2/1997 |
| WO | 2006040058 A1 | 4/2006 |
| WO | 2016187366 A1 | 11/2016 |

* cited by examiner

CONVEYING STORAGE DEVICE AND METHOD FOR OPERATING THE CONVEYING STORAGE DEVICE

RELATED APPLICATIONS

This application is a National Stage of International Application No. PCT/EP2018/064019 filed May 29, 2018, which claims the benefit of German Patent Application No. 10 2017 212 124.6 filed Jul. 14, 2017, both of which are incorporated by reference herein.

FIELD OF THE INVENTION

The present disclosure relates to a conveying storage device.

BACKGROUND

In container treatment lines, where containers generally pass through several treatment stations, the treatment stations can treat the containers at different rates per hour and faults in one or more of the treatment stations may result in a backlog of containers. In order to prevent the container treatment machine from stopping, one or more accumulation tables are provided in the container treatment machine which serve as a buffer, i.e. intermediate storage, for the containers. The accumulating containers are stored on the accumulation table/the accumulation tables until they are returned to the process/processes of the container treatment machine, for example in a single row without gaps, by means of a discharge conveyor.

DE 603 08 498 T2 discloses an accumulation conveyor for containers with an accumulation table, upstream of which a charging conveyor is mounted, with a transfer conveyor which is arranged downwards and in the extension of the accumulation table, and with a transition conveyor which is configured to run side by side and in the reverse direction of passage to the transfer conveyor. A pressure-free aligner extends parallel to the accumulation table and is designed as a table and further in such a way that it is loaded with containers upwards through the transfer conveyor and leads containers in a single row downwards to a downwardly arranged treatment unit. The table can have a length that can be adapted to the number of containers that are attempted to accumulate between two treatment units or that are needed to empty upstream treatment units in the event of a fault. In particular, the table may consist of one or more modules. The transfer conveyor includes a first guide rail to push the containers sideways onto the transfer conveyor. The pressure-free aligner includes a second guide rail above the table to align the containers in a single row. The transfer conveyor comprises a third guide rail to drive the containers transversely with respect to their movement and in a direction opposite to that given to them by the first guide rail. The side-by-side arrangement of the transfer conveyor and the pressure-free aligner allows the accumulating conveyor to be space saving so that it occupies little floor space.

Hartness International, Inc., Greenville, S.C., USA offers a buffer device DYNAC 7100SF, in which containers enter a buffer moving in a first direction, the size of which can be dynamically adapted to the quantity of containers, and containers are conveyed by means of a deflecting device from the buffer onto a parallel, subsequently arranged discharge conveyor moving in the opposite direction to the first. A separating device is arranged downstream of the discharge conveyor.

DETAILED DESCRIPTION

Embodiments of the present disclosure are directed to a conveying storage device that allows a dynamically adjustable storage size and container separation with optimized space requirements of the conveying storage device.

The conveying storage device for containers, such as bottles or cans according to embodiments of the disclosure comprises a first drivable conveyor adapted to convey containers on a first conveying surface in a first direction, and a second drivable conveyor adapted to convey containers on a second conveying surface in a second direction. The first conveyor and the second conveyor are arranged in parallel to each other such that containers are transferable from the first conveying surface to the second conveying surface. The first direction and the second direction are opposite to each other. In addition, the conveying storage device comprises a transfer device which is movable along the conveyors for transferring containers from the first conveying surface to the second conveying surface, a guide body which can be moved along a region between the first conveyor and the second conveyor above the first conveying surface and the second conveying surface, and a guide railing for guiding and separating containers, said guide railing extending at an angle to the second direction and above the second conveying surface. The guide railing is variable in length and cooperates with the guide body in such a way that a length of the guide railing and the angle can be varied.

During operation of the conveying storage device, the guide body can be moved in the first direction and by cooperating with the guide railing the guide railing can be extended, or the guide body can be moved in the second direction and by cooperating with the guide railing the guide railing can be shortened.

In general, the first and second conveying surfaces are of coplanar configuration. The first and second conveyors can be approximately adjacent to each other without distance in the region between the first and second conveyors.

The transfer device can be moved by means of a traversing device which is preferably arranged above the first and/or second conveying surface in such a way that there is no disturbance of the container transport in the conveying storage device; the traversing device can also be arranged laterally of the conveying storage device.

The guide body can be moved by means of another traversing device which is preferably arranged above the first and/or second conveying surface in such a way that there is no disturbance of the container transport in the conveying storage device; the other traversing device can also be arranged laterally of the conveying storage device.

The traversing device of the transfer device or the guide body and thus the transfer device or the guide body can each be driven by a controllable drive motor.

The guide railing may be arranged to extend from the region between the first and second conveyors above the second conveying surface to an end region of the second conveyor located in the second direction. The term "above" is understood to mean that the guide railing does not come into contact with the second conveying surface, but that containers present in the conveyor which are moved in the second direction can come into contact with the guide railing so that it is possible to guide and separate containers. This ensures that containers which are conveyed in the second direction on the second conveying surface come into at least partial contact with the guide railing and are thus separated along a conveying path along the guide railing, i.e. are brought into a single, gapless track.

It may be provided that the first end of the guide railing is connected to the guide body and that the second end of the guide railing is connected to the end portion of the second conveyor located in the second direction, which is generally non-movable. Therefore, the first end can be moved by means of the guide body, whereas the second end is generally not moved. Since the guide railing is variable in length, the length of the guide railing can be changed by moving the guide body.

The guide railing can be supported on the first conveying surface by one or more rollers.

The transfer device can be supported by one or more rollers on the first and/or second conveying surface.

The guide railing can be configured telescopically, preferably the guide railing being configured rotatably about a first vertical axis and rotatably about a second vertical axis, wherein the first axis is provided on the guide body and wherein the second axis is provided in a non-movable end portion of the second conveyor. Due to the telescopic configuration of the guide railing, it is possible to easily change its length. If, for example, the guide body is moved in the first direction, the length of the guide railing increases, whereas if, for example, the guide body is moved in the second direction, the length of the guide railing decreases, wherein the change in length is caused by the movement of the guide body. The angle between the guide railing and the second direction also changes with the movement of the guide body. The first and second axes allow the necessary movement between the guide railing, guide body, and the non-movable end of the second conveyor, which allows change of length of the guide railing and change of angle when the guide body is moved.

In another embodiment, the guide railing may be configured as a length-variable and tensioned band, wherein preferably a length-variation of the band may be effected by winding or unwinding the band, wherein preferably a tension of the band is achieved by means of at least one motor and/or by means of at least one spring. The band is preferably configured as a flat band.

The guide body can be configured to be variable in width. The width can be changed by means of a spindle or a linear drive, driven for example by one or more drive motors and controlled by one or more control devices. Other known types of drive are also feasible.

Preferably, the guide body can be configured so as to be movable independently of the transfer device or the guide body can be configured so as to be coupled with the transfer device and movable together with the transfer device.

The first conveyor and the second conveyor can be configured as linear conveyors.

The first and/or second conveyor may each comprise several parallel endless conveyor belts or slat-band chains, wherein the conveyor belts or slat-band chains are preferably each individually drivable. Preferably, the width of such a conveyor belt or slat-band chain corresponds to the maximum expansion of the cross-section of the containers to be conveyed plus 1%-5%; for example, the width may be 85 mm. It may be provided that the conveyor belts/slat-band chains which are located closer to the region between the first and second conveyors are driven at a lower speed than those conveyor belts/slat-band chains which are located further away from that region.

The transfer device can essentially extend across and above the first conveying surface. Containers on the first conveying surface can be intercepted by the transfer device and guided substantially transversely across the first conveying surface onto the second conveying surface. The term "above" is understood to mean that the transfer device does not come into contact with the first conveying surface, but containers on it may come into contact with the transfer device.

The transfer device in addition may extend substantially transversely across and above at least part of the second conveying surface. Thus, the transfer device can also direct containers that have been intercepted on the first conveying surface and directed substantially transversely across the first conveying surface onto the second conveying surface on the second conveying surface before the containers are conveyed by the conveyor to the second direction.

The transfer device may comprise an arcuate or straight guide element, wherein a drivable endless conveyor belt preferably runs over the guide element, wherein the conveyor belt is preferably configured as a gripper chain or belt. The drive direction of the conveyor belt is provided such that containers can be transferred from the first to the second conveying surface.

An elongated transition surface may be located between the first conveying surface and the second conveying surface. Preferably, the width of the transition surface is smaller or approximately equal to the maximum expansion of the cross-section of the containers to be conveyed. The transition surface may be provided to mitigate the change in speed at a transfer from the first to the second conveying surface.

The transition surface can be designed as a third conveyor with a third conveying surface, which is configured to be movable in the first direction and in the second direction.

The guide body can be arranged on the third conveying surface and can preferably be moved by means of the third conveyor. This means that no further traversing device is required for the guide body. It is also feasible that the guide body is supported on the third conveying surface by means of a roller, for example.

The conveying storage device in addition may comprise a further guide railing for guiding containers which extends above the first conveying surface and parallel to the first direction, wherein the further guide railing is designed to be variable in length, preferably telescopically, wherein the further guide railing is preferably configured to be laterally displaceable parallel to the first conveying surface and perpendicular to the first direction. Through the further guide railing it is possible to reduce or increase the width of the first conveying surface accessible for containers by means of the lateral displaceability. The length of the further guide railing is preferably adapted to the position of the guide body.

The conveying storage device in addition may comprise one or more drive motors for the first conveyor, the second conveyor, the transfer device, and the guide body.

In addition, the conveying storage device may comprise at least one sensor device and at least one control device. The sensor device is adapted to detect containers by means of one or more sensors, to generate corresponding sensor data and to transmit the sensor data to the at least one control device which is adapted to control the first conveyor, the second conveyor, the transfer device, and the guide body or their drive motors. The control device is preferably configured such that a movement of the transfer device takes place on the basis of conveying speeds of the first and/or second conveyor. It is also feasible that a camera or other suitable system may acquire data on the occupancy status (percentage of occupied width relative to total width) of the feeding and/or discharging conveyor before or after the conveying storage device, and the control device may, on the basis of such data, move the transfer device to provide the required storage capacity of the conveying storage device. The transfer device is moved away from the inlet if more containers enter the conveying storage device than exit and the transfer device is moved towards the inlet if more containers exit the conveying storage device than enter it.

A method according to embodiments of the disclosure, preferably a computer-controlled method, is used to operate the conveying storage device as described above and/or below.

Figure 1:
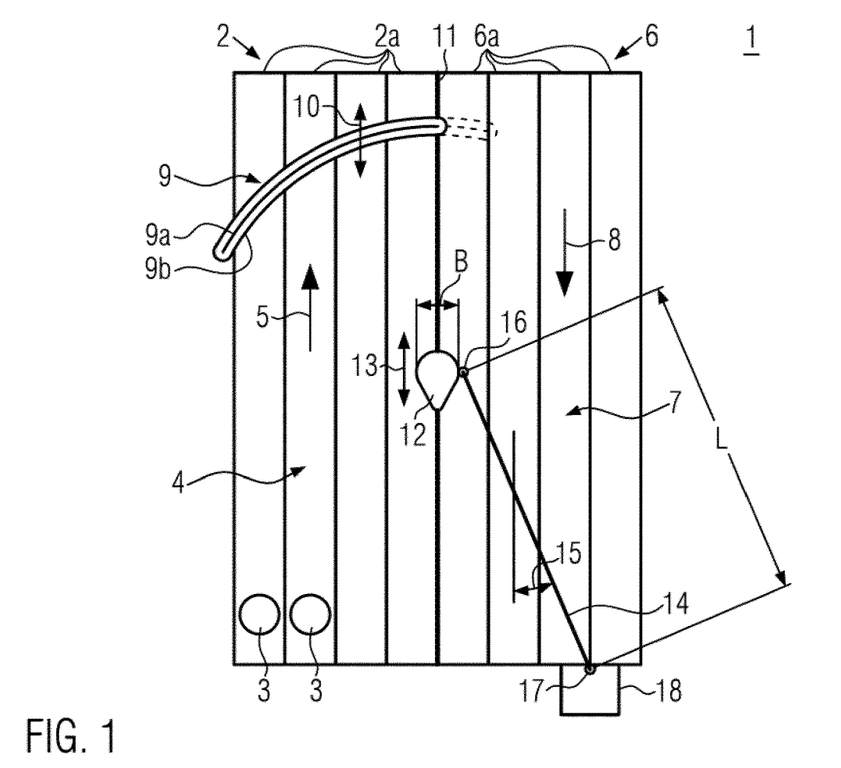
FIG. 1 shows a top view of a first embodiment of a conveying storage device.

FIG. 1 shows a top view of a first embodiment of a conveying storage device 1 for containers 3, such as bottles or cans; in FIG. 1, cans 3 are exemplarily shown.

The conveying storage device 1 comprises a first drivable conveyor 2 which can transport containers 3 on a first conveying surface 4 in a first direction 5, and a second drivable conveyor 6 which can transport containers 3 on a second conveying surface 7 in a second direction 8. The first 2 and the second conveyor 6 are arranged parallel to each other such that containers 3 can be transferred from the first 4 to the second conveying surface 7; generally the first 4 and the second conveying surface 7 are coplanar. The first 5 and the second direction 8 are opposite to each other.

If it is stated here or below that containers are placed/transported on a conveyor, etc., it is understood that the containers are placed/transported on the conveying surface, etc.

In the illustration, the first conveyor 2 exemplarily comprises four conveyor belts 2a and the second conveyor 6 exemplarily four conveyor belts 6a. During operation of the conveying storage device 1, the conveyor belts 2a, 6a further away from the region 11 can be moved faster in the first 5 or second direction 8 than the conveyor belts 2a, 6a closer to the region 11.

The conveying storage device 1 further comprises a transfer device 9 movable along the conveyors 2, 6 for transferring containers 3 from the first conveying surface 4 to the second conveying surface 7, wherein the transfer device 9 is movable in a direction 10 parallel to the first 5 or the second direction 8, respectively. The transfer device 9 comprises an arcuate guide element 9a over which a drivable endless conveyor belt 9b runs. With continuous lines, the transfer element 9 is shown which extends substantially transversely across and above the first conveying surface 4; with dotted lines, an additional part of the transfer device 9 is optionally shown which extends substantially in addition transversely across and above a part of the second conveying surface 7.

In addition, the conveying storage device 1 comprises a guide body 12 movable along a region 11 between the first conveyor 2 and the second conveyor 6 above the first conveying surface 4 and the second conveying surface 7, wherein the guide body 12 is movable in a direction 13 parallel to the first 5 and the second direction 8, respectively. The guide body 12 can be moved independently of the transfer device 9. The width B of the guide body 12 is preferably variable.

In addition, the conveying storage device 1 comprises a variable length guide railing 14 for guiding and separating containers 3 which extends at an angle 15 to the second direction 8 and above the second conveying surface 7 and cooperates with the guide body 12 such that a length L of the guide railing 14 and the angle 15 are variable, for example when the guide body 12 is moved in the first direction 5 and the second direction 8, respectively.

The guide railing 14 is configured rotatably about a first vertical axis 16 and rotatably about a second vertical axis 17, wherein the first axis 16 is provided on the guide body 12 and wherein the second axis 17 is provided in a non-movable end portion 18 of the second conveyor 5—seen in the second direction 8.

Therefore, by moving the guide body 12 in the first direction 5, the guide railing 14 is extended and the angle 15 is reduced. Accordingly, by moving the guide body 12 in the second direction 8, the guide railing 14 is shortened and the angle 15 is increased.

Figure 2:
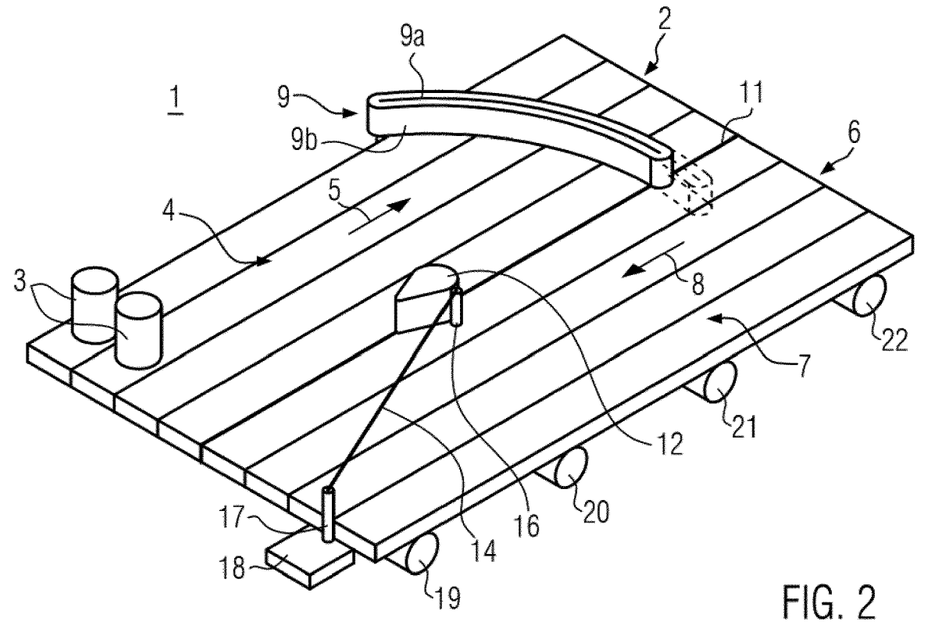
FIG. 2 shows a diagonal view of the conveying storage device from FIG. 1.

FIG. 2 shows a diagonal view of the conveying storage device 1 from FIG. 1. This illustration exemplarily shows drive motors 19, 20, 21, 22 for the first conveyor 2, the second conveyor 6, the transfer device 9, and the guide body 12, which are controllable for example by means of at least one control device.

In the diagonal view it can be seen that the guide body 12, the transfer device 10, and the guide railing 14 are arranged above the first 4 or the second conveying surface 7. The term "above" is to be understood here such that a) the guide body 12 does not come into contact with the first 4 or the second conveying surface 7, respectively, but containers 3 present in the conveying storage device 1 can come into contact with the guide body 12 so that by means of the guide body 12 a container-free region can be formed in and sideways of the region 11, b) the transfer device 9 does not come into contact with the first conveying surface 4 or the part of the second conveying surface 8, respectively, but containers 3 present in the conveying storage device 1 can come into contact with the transfer device 9 so that a transfer of containers 3 from the first 4 to the second conveying surface 7 is made possible, and c) the guide railing 14 does not come into contact with the second conveying surface 7, but containers 3 present in the conveying storage device 1 can come into contact with the guide railing 14 so that a guiding and separating of containers 3 is made possible. The transfer device 9 can be supported by means of a roller on the first 4 and/or the second conveying surface.

By means of the guide railing 14 it can be ensured that containers 3 which are conveyed on the second conveying surface 7 in the second direction 8 come at least partly into contact with the guide railing 14 and are thus separated on a conveying path along the guide railing 14, i.e. are brought into a single, gapless track.

Figure 3:
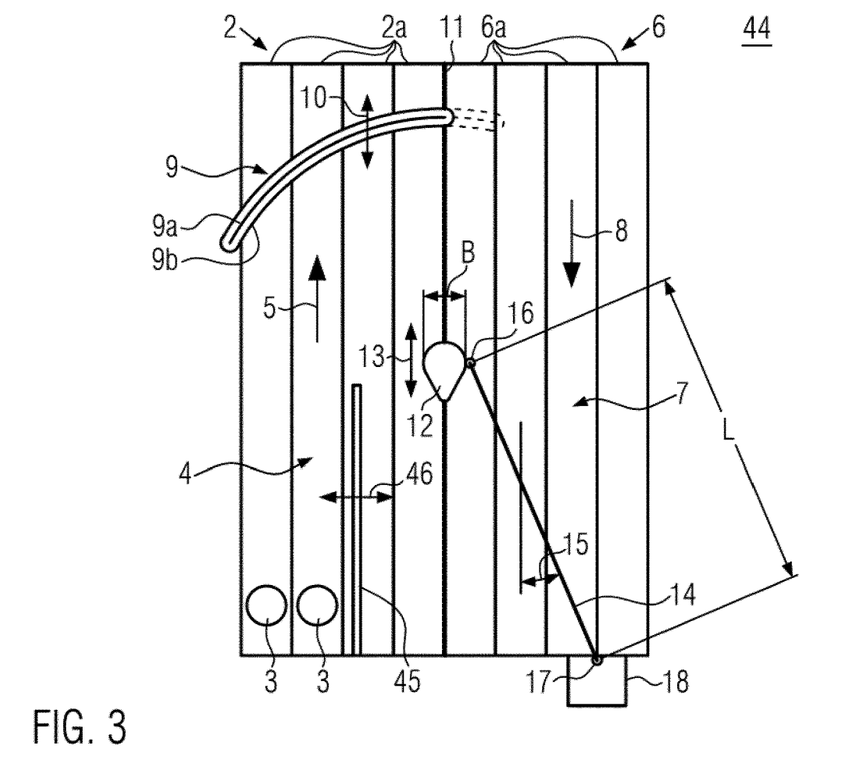
FIG. 3 shows a top view of a second embodiment of a conveying storage device.

FIG. 3 shows a top view of a second embodiment of a conveying storage device 44. This corresponds to the first embodiment 1 except for a further guide railing 45 for guiding containers 3.

The further guide railing 45 is arranged above the first conveying surface 4 and runs parallel to the first direction 5, wherein the further guide railing 45 is variable in length. The further guide railing 45 can be displaced laterally in one direction 46 parallel to the first conveying surface 4 and perpendicular to the first direction 5. For example, a holding and movement structure for displacing the further guide railing 45 can be arranged above the conveying storage device 44. It is also possible to support the guide railing 45 laterally and/or vertically from the region 11 with suitable means.

Due to the further guide railing 45, it is possible to reduce or increase the width of the first conveying surface 4 accessible for containers 3 by means of the lateral displacement. The length of the further guide railing 45 is preferably adapted to the position of the guide body 12 or the guide railing 45 is directly connected to the guide body 12.

The term "above" is to be understood such that the further guide railing 45 does not come into contact with the first conveying surface 4, but containers 3 present in the conveying storage device 44 can come into contact with the further guide railing 45 so that it is possible to guide containers 3. The guide railing 45 can be supported by a roller on the first conveying surface 4.

Figure 4:
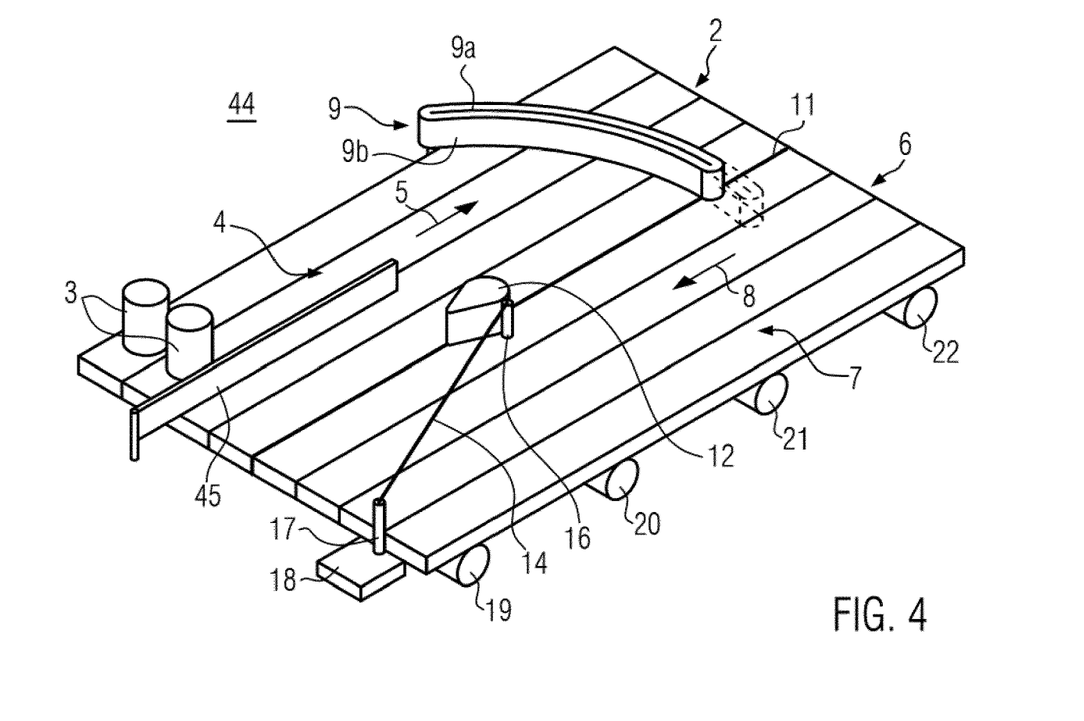
FIG. 4 shows a diagonal view of the conveying storage device from FIG. 3.

FIG. 4 shows a diagonal view of the conveying storage device 44 from FIG. 3.

Figure 5:
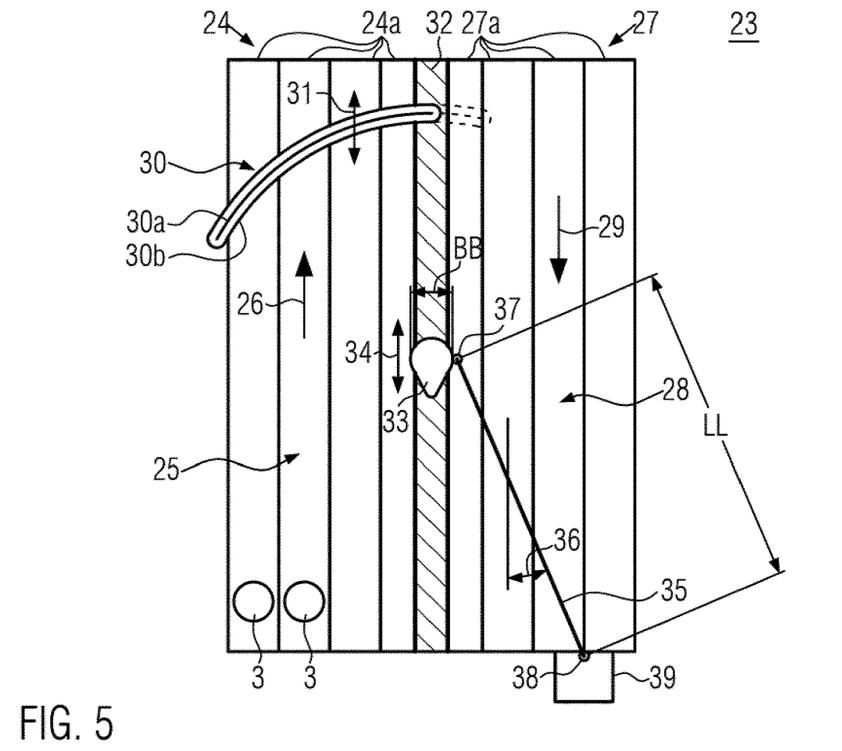
FIG. 5 shows a top view of a third embodiment of a conveying storage device.

FIG. 5 shows a top view of a third embodiment of a conveying storage device 23 for containers 3. The conveying storage device 23 comprises a first drivable conveyor 24 which can transport containers 3 on a first conveying surface 25 in a first direction 26, and a second drivable conveyor 27 which can transport containers 3 on a second conveying surface 28 in a second direction 29. The first 24 and second 27 conveyors are arranged parallel to each other such that containers 3 can be transferred from the first 25 to the second 28 conveying surface; generally the first 25 and second 28 conveying surfaces are coplanar. The first 26 and the second 29 direction are opposite to each other.

In the illustration, the first conveyor 24 exemplarily comprises four conveyor belts 24a and the second conveyor 27 exemplarily comprises four conveyor belts 27a. During operation of the conveying storage device 47, the conveyor belts 24a, 27a further away from the region 32 can be moved faster in the first 26 or second direction 29 than the conveyor belts 24a, 27a closer to the region 32.

The conveying storage device 23 further comprises a transfer device 30 movable along the conveyors 24, 27 for transferring containers 3 from the first conveying surface 25 to the second conveying surface 28, wherein the transfer device 30 is movable in a direction 31 parallel to the first 26 and the second direction 29, respectively. The transfer device 30 comprises an arcuate guide member 30a over which a drivable endless conveyor belt 30b extends. With continuous lines, the transfer member 30 is shown extending substantially transversely across and above the first conveying surface 25. With dotted lines, optionally an additional part of the transfer device 30 is shown, which essentially in addition extends across and above a part of the second conveying surface 28.

In a region between the first 24 and the second conveyor 27, a transition surface 32 (hatched highlighted) is provided. The conveying storage device 23 additionally comprises a guide body 33 movable along the transition surface 32 above the first 25 and the second conveying surface 28, wherein the guide body 33 is movable in a direction 34 parallel to the first 26 and the second direction 29, respectively. The guide body 33 can be moved independently of the transfer device 30. Preferably, the guide body 33 is configured to be variable in its width BB.

In addition, the conveying storage device 23 comprises a variable length guide railing 35 for guiding and separating containers 3, extending at an angle 36 to the second direction 29 and above the second conveying surface 28, and cooperating with the guide body 33 such that a length LL of the guide railing 35 and the angle 36 are variable, for example when the guide body 33 is moved in the first 26 and the second direction 29, respectively.

The guide railing 35 is configured rotatably about a first vertical axis 37 and rotatably about a second vertical axis 38, wherein the first axis 37 is provided on the guide body 33 and wherein the second axis 38 is provided in a non-movable end portion 39 of the second conveyor 27—seen in the second direction.

By moving the guide body 33 in the first direction 26, the guide railing 35 is extended and the angle 36 is reduced. Accordingly, by moving the guide body 33 in the second direction 29, the guide railing 35 is shortened and the angle 36 is increased.

Figure 6:
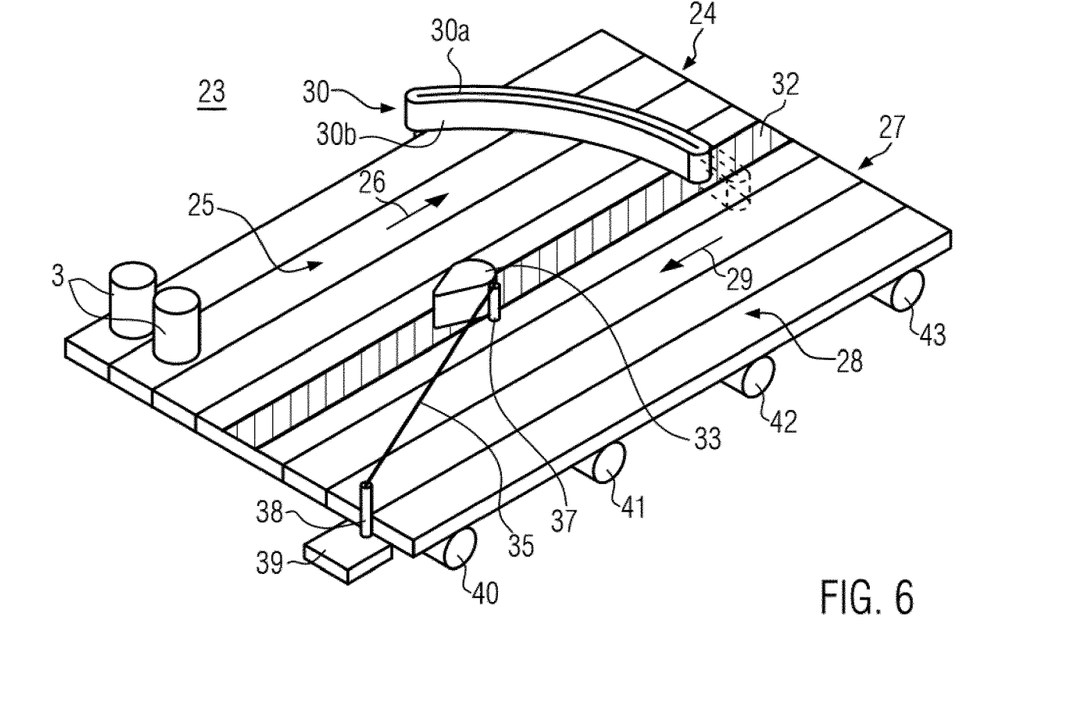
FIG. 6 shows a diagonal view of the conveying storage device from FIG. 5.

FIG. 6 shows a diagonal view of the conveying storage device 23 from FIG. 5. This illustration exemplarily shows drive motors 40, 41, 42, 43 for the first conveyor 24, the second conveyor 27, the transfer device 30, and the guide body 33, which are controllable, for example, by means of at least one control device.

In the diagonal view it can be seen that the guide body 33, the transfer device 30, and the guide railing 35 are arranged above the first 24 and the second conveying surface 28, respectively. The term "above" here has the same meaning as already explained in connection with the first embodiment 1. The guide body 33 can be coupled with the transition surface 32 so that the passage area from the first conveyor 24 to the second conveyor 27 can be varied in size by means of the drive motor 42.

Figure 7:
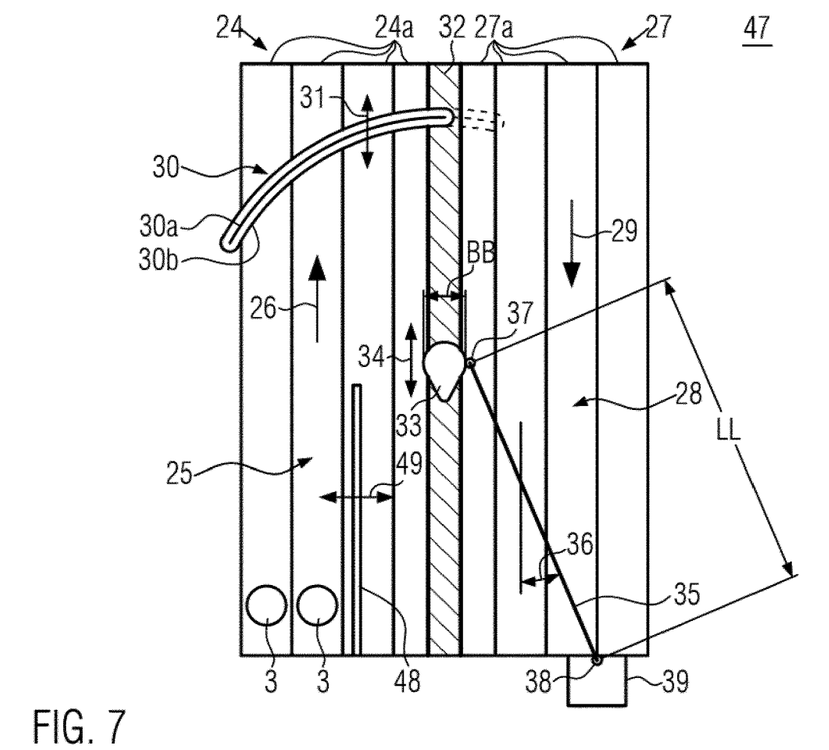
FIG. 7 shows a top view of a fourth embodiment of a conveying storage device.

FIG. 7 shows a top view of a fourth embodiment of a conveying storage device 47 which corresponds to the third embodiment 23 except for a further guide railing 48 for guiding containers 3.

The further guide railing 48 is arranged above the first conveying surface 25 and runs parallel to the first direction 26, wherein the further guide railing 48 is also variable in length. The further guide railing 48 is laterally displaceable in one direction 49 parallel to the first conveying surface 25 and perpendicular to the first direction 26. For example, a holding and movement structure for moving the further guide railing 48 can be arranged above the conveying storage device 47. Lateral support is also possible.

Due to the further guide railing 48, it is possible to reduce or increase the width of the first conveying surface 25, which is accessible for container 3, by means of the lateral displaceability. The length of the further guide railing 48 is preferably adapted to the position of the guide body 33.

The term "above" is to be understood such that the further guide railing 48 does not come into contact with the first conveying surface 25, but containers 3 present in the conveying storage device 47 can come into contact with the further guide railing 48, so that it is possible to guide containers 3.

Figure 8:
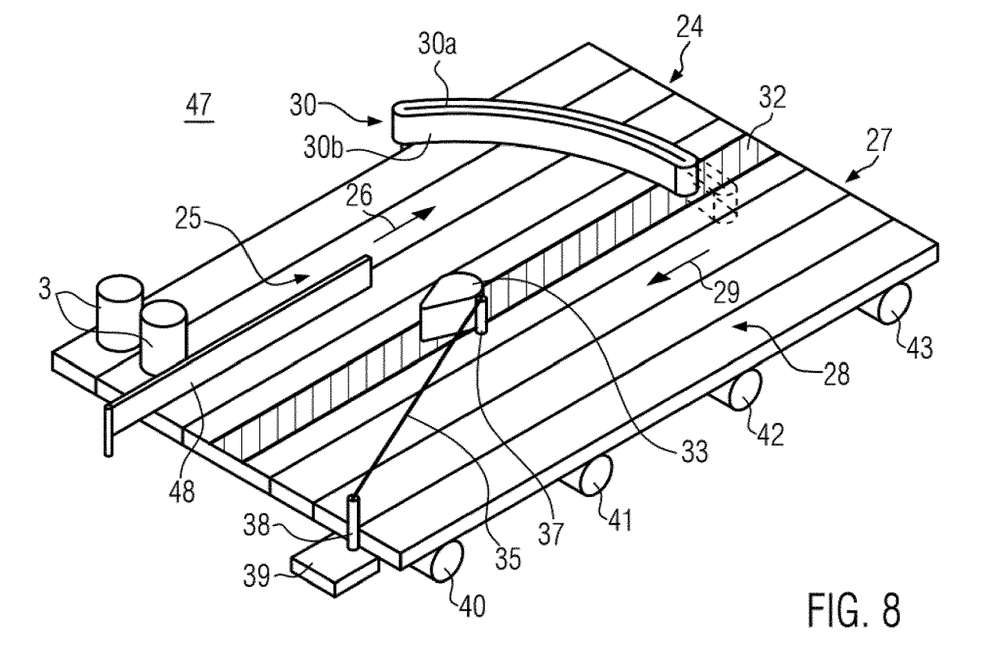
FIG. 8 shows a diagonal view of the conveying storage device from FIG. 7.

FIG. 8 shows a diagonal view of the conveying storage device 47 from FIG. 7.

Figure 9A:
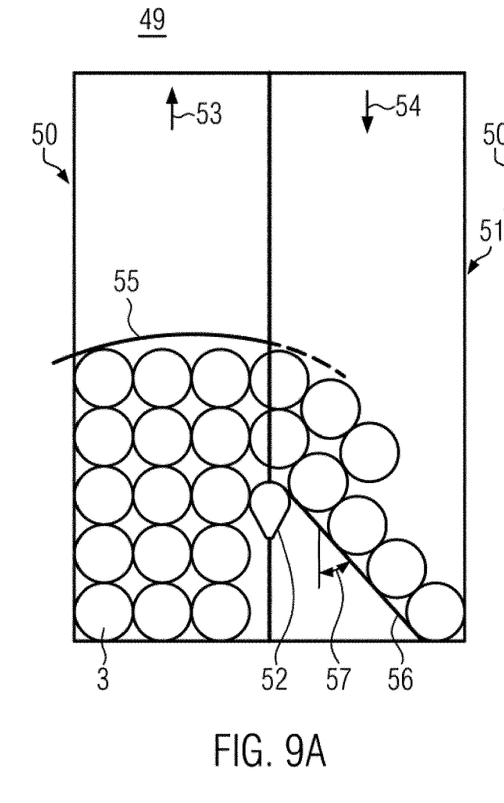
FIG. 9A shows a top view of a schematically reduced illustration of a conveying storage device in a first operating state.
Figure 9B:
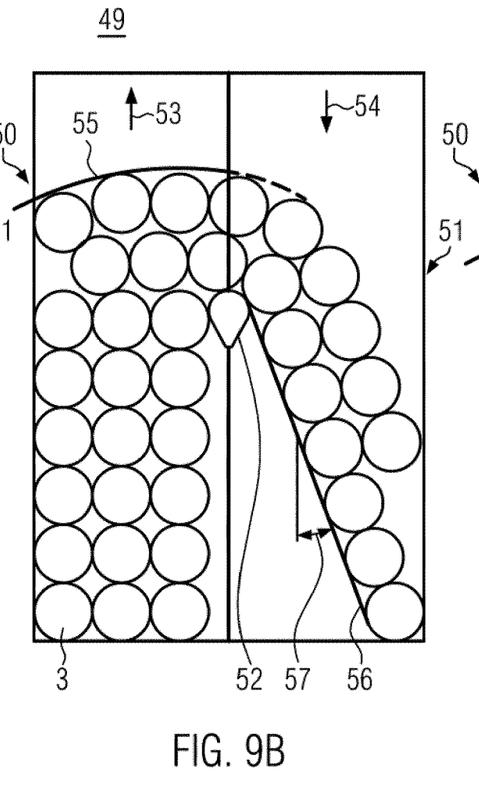
FIG. 9B shows a top view of the conveying storage device in a second operating state.
Figure 9C:
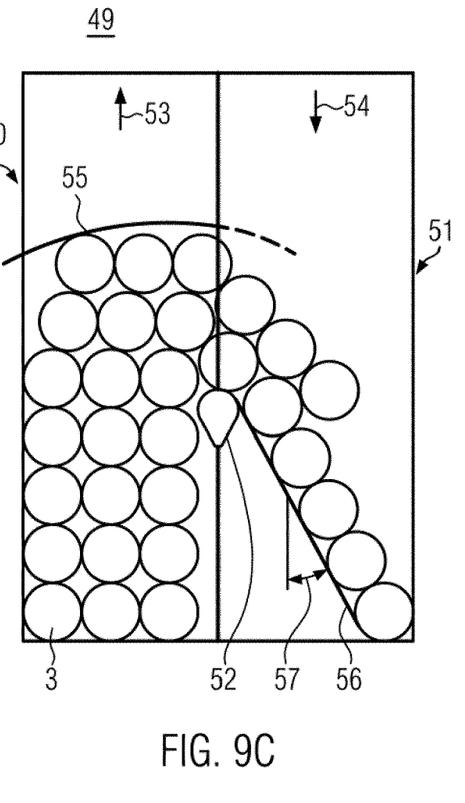
FIG. 9C shows a top view of the conveying storage device in a third operating state.

FIGS. 9A to 9C show top views of a schematically reduced illustration of a conveying storage device 49 which may correspond to the first 1 or third embodiment 23 in three different states during operation of the conveying storage device 49. For the sake of clarity, the individual conveyor belts of the first 50 and the second conveyor 51 were not shown. A possible transition surface (third embodiment 23) along which or by means of which the guide body 52 can be moved in the first 53 or the second direction 54 was also not shown, but only a region between the first 50 and the second conveyor 51.

FIG. 9A shows the conveying storage device 49 in a first operating state, wherein the guide body 52 and the transfer device 55 are each in a first position. These first two positions are different and arranged relative to each other such that in a transfer region between the guide body 52 and the transfer device 55 a transfer of containers 3 from the first conveyor 50 to the second conveyor 51 is possible. Exemplarily, a plurality of containers 3 are moved in three tracks on the conveying surface of the first conveyor 50 in the first direction 53 towards the transfer device 55. Those containers 3 coming into contact with it are transferred by it to the second conveyor 57 so that containers 3 can advance to the first conveyor 50. The guide body 52 can support the transfer device 55 by creating a spatial separation of containers 3 on the first conveying surface and containers on the second conveying surface. Preferably, further means are provided between the guide body 52 and the inlet end of the device to prevent a transition of containers 3 from conveyor 50 to conveyor 51 outside the intended transition area between transfer device 55 and guide body 52. The guide railing 56 arranged at one end of the guide body 52 forms an angle 57 with the second direction 54. The second conveyor 51 transports the containers 3 transferred to it in the second direction 54 so that they meet the guide railing 56 which serves to guide and separate the containers 3, whereby the containers 3 are brought into a single, gapless track. On the first conveyor 50, there are arranged more containers 3 compared to the second conveyor 51 which explains the storage function of the conveying storage device.

FIG. 9B shows a plan view of the conveying storage device 49 in a second operating state, wherein the transfer device 55 and the guide body 52 have each been moved along the first direction 53 to a respective second position. These movements occur during operation of the conveying storage device 49. As a result, there is provided more space on the first conveyor 50 for containers 3 so that in the second operating state more containers 3 can be temporarily stored before they leave the conveying storage device 49 again via the second conveyor 51. By moving the guide body 52 to its second position, the length of the variable length guide railing 56 was increased compared to the first operating state shown in FIG. 9A and the angle between the guide railing 56 and the second direction 54 was reduced.

FIG. 9C shows a top view of the conveying storage device 49 in a third operating state in which the transfer device 55 and the guide body 52 have each been moved along the second direction 54 to a respective third position which is exemplarily between the first and second positions. As a result, there is provided less space on the first conveyor 50 for containers 3 than in the second operating state, but more space than in the first operating state. By moving the guide body 52 to its third position, the length of the variable length guide railing 56 was reduced compared to the second operating state shown in FIG. 9B and the angle between the guide railing 56 and the second direction was increased.

Figure 10A:
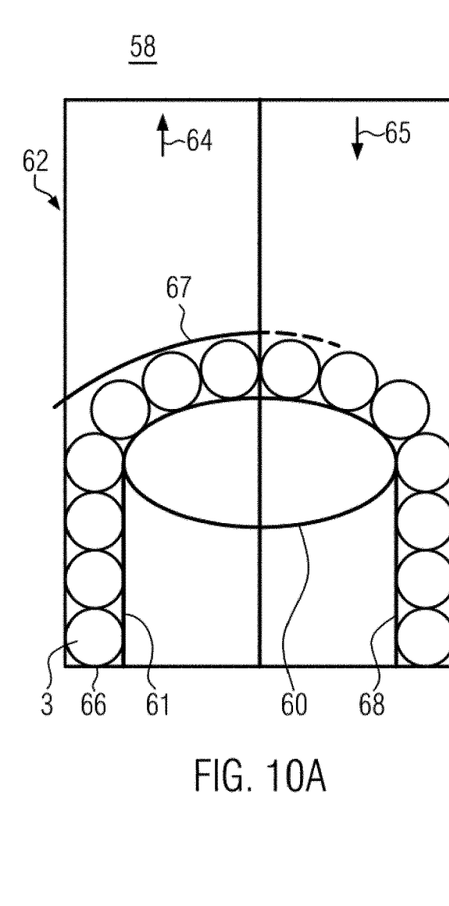
FIG. 10A shows a top view of a schematically reduced illustration of a conveying storage device with a variable width guide body and further guide railing in a first operating state.

FIG. 10A shows a top view of a schematically reduced illustration of a conveying storage device 58 in a first operating state, which can correspond to the second 44 or fourth design 47, respectively, with a variable width guide body 60 and a further guide railing 61. For the sake of clarity, the individual conveyor belts of the first 62 or the second conveyor 63, respectively, were not shown. A possible transition surface (fourth embodiment 47) along which or by means of which the guide body 60 can be moved in the first 64 or the second direction 65 was also not shown, but only a region between the first 62 and the second conveyor 63.

The further guide railing 61 is arranged such that a lane 66 is available on the first conveyor 62 for conveying containers 3 in the first direction 64. The width of the guide body 60, its position, and the position of the transfer device 67 are such that a single-lane transfer of the containers 3 from the first conveyor 62 to the second conveyor 63 takes place. On the second conveying surface, the containers 3 are moved in the second direction 65 and arranged along the guide railing 68 in a single, gapless track. In this arrangement, the guide railing 68 is arranged parallel, or at least approximately parallel, to the second direction, i.e. the angle between the guide railing 68 and the second direction 65 is 0° or approximately 0°.

Figure 10B:
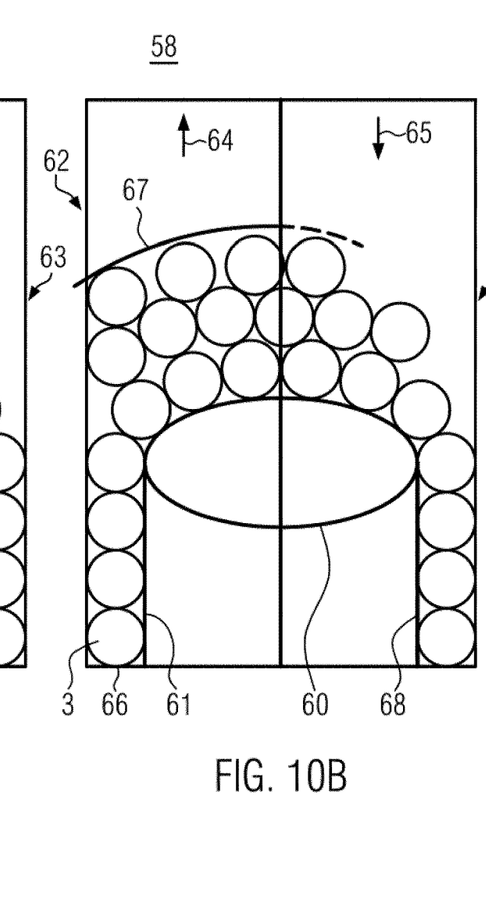
FIG. 10B shows a top view of the conveying storage device in a second operating state.

If the storage requirement increases, the conveying storage device 58 can be moved to a second operating state, as shown in FIG. 10B, by moving the transfer device 67 in the first direction 64 so that more space for containers 3 is available between the transfer device 67 and the guide body 60. The guide railing 68 also makes it possible to arrange the containers on the second conveyor 63 in a single, gapless track.

Figure 10C:
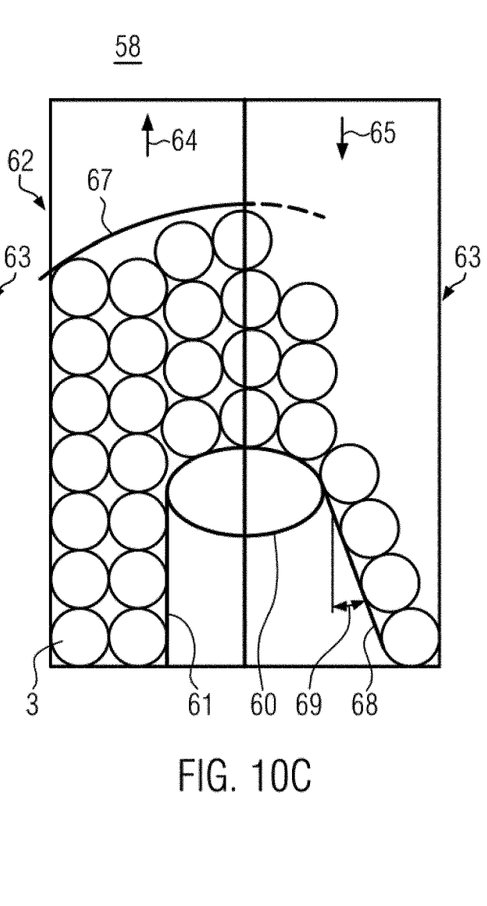
FIG. 10C shows a top view of the conveying storage device in a third operating state.

If the storage requirement of the storage conveyor 58 continues to increase, the guide body 60 can be moved in the second direction 65, its width reduced, and the further guide railing 61 can be moved laterally, as shown in FIG. 10C. Thus, on the first conveyor 62, exemplarily two tracks are available for conveying containers 3 in the first direction 64. By moving the guide body 60 in the second direction 65, the length of the further guide railing 61 is reduced. The length of the guide railing 68 is reduced by reducing the width of the guide body 60 and the angle 69 between the guide railing 68 and the second direction 65 is increased by reducing the width of the guide body 60.

The invention claimed is:

1. A conveying storage device for containers, comprising:
   a first drivable conveyor which is adapted to convey containers on a first conveying surface in a first direction;
   a second drivable conveyor which is adapted to convey containers on a second conveying surface in a second direction, wherein the first drivable conveyor and the second drivable conveyor are positioned parallel to one another such that containers are transferable from the first conveying surface to the second conveying surface, and wherein the first direction and the second direction are opposite to each other;

a transfer device, which is movable along at least one of the first drivable conveyor or the second drivable conveyor, for transferring containers from the first conveying surface (4, 25) to the second conveying surface;

a guide body which is movable along a region between the first drivable conveyor and the second drivable conveyor above the first conveying surface and the second conveying surface; and a guide railing for guiding and separating containers, which extends at an angle to the second direction and above the second conveying surface, wherein the guide railing is variable in length and cooperates with the guide body such that the length of the guide railing and the angle can be varied.

2. The conveying storage device according to claim 1, wherein the guide railing is configured telescopically.

3. The conveying storage device of claim 2, wherein the guide railing is configured rotatably about a first vertical axis and rotatably about a second vertical axis, wherein the first vertical axis is provided on the guide body, and wherein the second vertical axis is provided in a non-movable end region of the second drivable conveyor.

4. The conveying storage device according to claim 1, wherein the guide railing is configured as a length-variable and tensioned band.

5. The conveying storage device of claim 4, wherein a length-variation of the band takes place by winding up or unwinding the band, and wherein a tension of the band is achieved by means of at least one of a motor or a spring.

6. The conveying storage device according to claim 1, wherein the guide body is configured to be variable in its width.

7. The conveying storage device of claim 6, wherein a) the guide body is configured to be movable independently of the transfer device orb) the guide body is coupled to the transfer device and is configured to be movable together with the transfer device.

8. The conveying storage device according to claim 1, wherein the first drivable conveyor and the second drivable conveyor are configured as linear conveyors.

9. The conveying storage device according to claim 1, wherein at least one of the first drivable conveyor or the second drivable conveyor each comprises a plurality of parallel, endless conveyor belts or slat-band chains, wherein the endless conveyor belts or the slat-band chains are each drivable individually.

10. The conveying storage device according to claim 1, wherein the transfer device extends substantially transversely across and above the first conveying surface.

11. The conveying storage device according to claim 10, wherein the transfer device further extends substantially transversely across and above at least a portion of the second conveying surface.

12. The conveying storage device according to claim 1, wherein the transfer device comprises an arcuate guide element or a straight guide element, wherein a drivable, endless conveyor belt extends over the arcuate guide element or the straight guide element, and wherein the drivable, endless conveyor belt is configured as a gripper chain or belt.

13. The conveying storage device according to claim 1, wherein an elongated transition surface is arranged between the first conveying surface and the second conveying surface.

14. The conveying storage device according to claim 13, wherein the elongated transition surface is configured as a third conveyor with a third conveying surface which is configured to be movable in the first direction and in the second direction.

15. The conveying storage device according to claim 14, wherein the guide body is arranged on the third conveying surface and is movable by means of the third conveyor or wherein the guide body is supported on the third conveying surface by means of a roller.

16. The conveying storage device according to claim 1, further comprising:
a further guide railing for guiding containers, which extends above the first conveying surface and parallel to the first direction, wherein the further guide railing is configured to be variable in length, and wherein the further guide railing is configured to be laterally displaceable parallel to the first conveying surface and perpendicular to the first direction.

17. The conveying storage device according to claim 1, further comprising:
one or more drive motors for the first drivable conveyor, the second drivable conveyor, the transfer device, and the guide body.

18. The conveying storage device according to claim 1, further comprising:
at least one sensor device and at least one control device, wherein the at least one sensor device is configured to detect containers by means of one or more sensors, to generate corresponding sensor data and to transmit the sensor data to the at least one control device, which is adapted to control the first drivable conveyor, the second drivable conveyor, the transfer device, and the guide body.

19. The conveying storage device of claim 18, wherein the control device is configured such that a movement of the transfer device on the basis of conveying speeds of at least one of the first conveyor or of the second conveyor takes place.

20. The conveying storage device of claim 18, wherein a camera detects data of an occupancy state of at least one of a feeding or a discharging conveyor before or after the conveying storage device, and wherein the control device moves the transfer device on the basis of this data in such a way that a required storage capacity of the conveying storage device is provided.

* * * * *